Oct. 11, 1927.
R. A. WILSON
BOX AND PIN COUPLING
Filed June 14, 1926    2 Sheets-Sheet 1
1,645,032
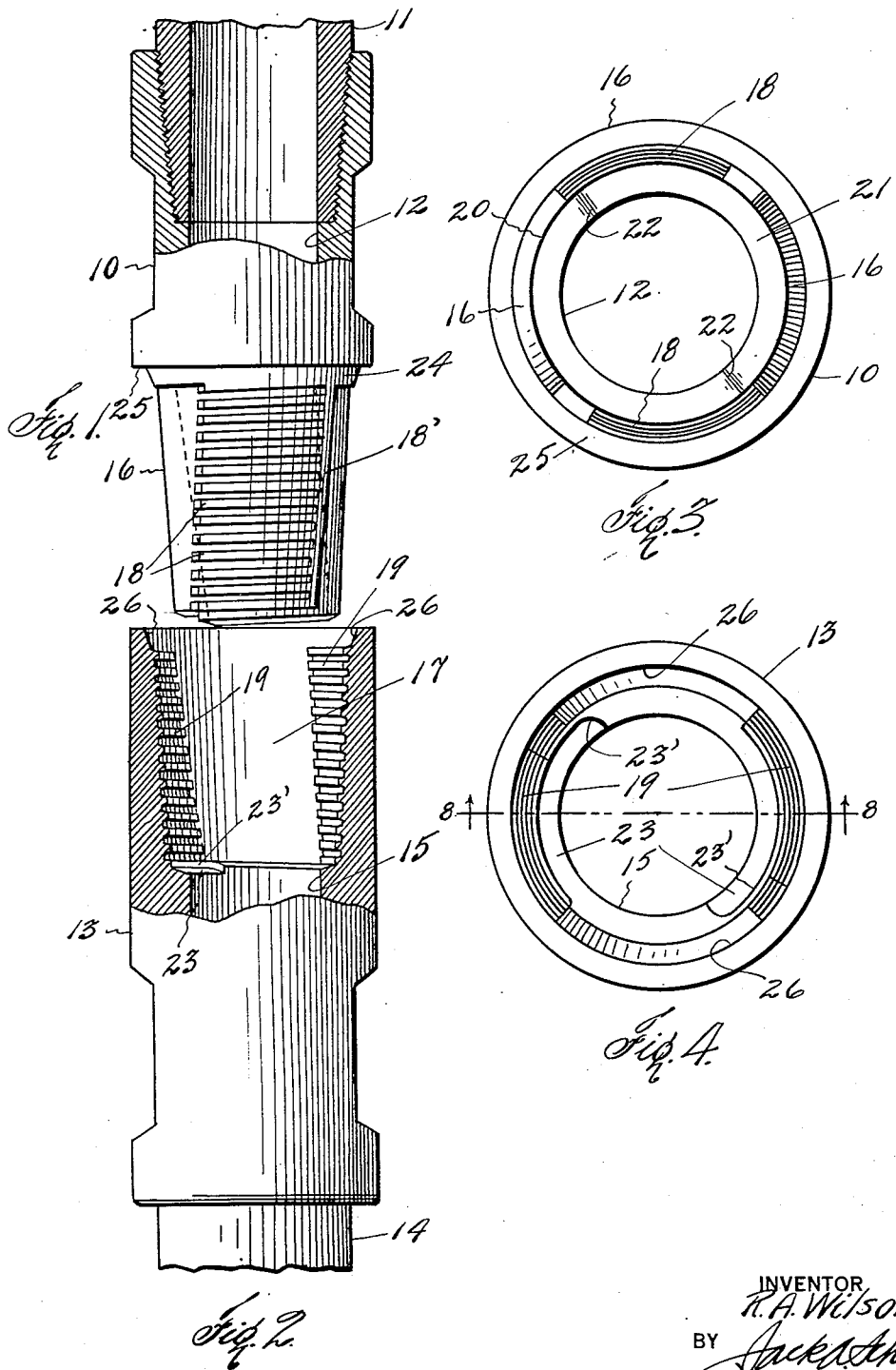
INVENTOR
R. A. Wilson
BY
ATTORNEY

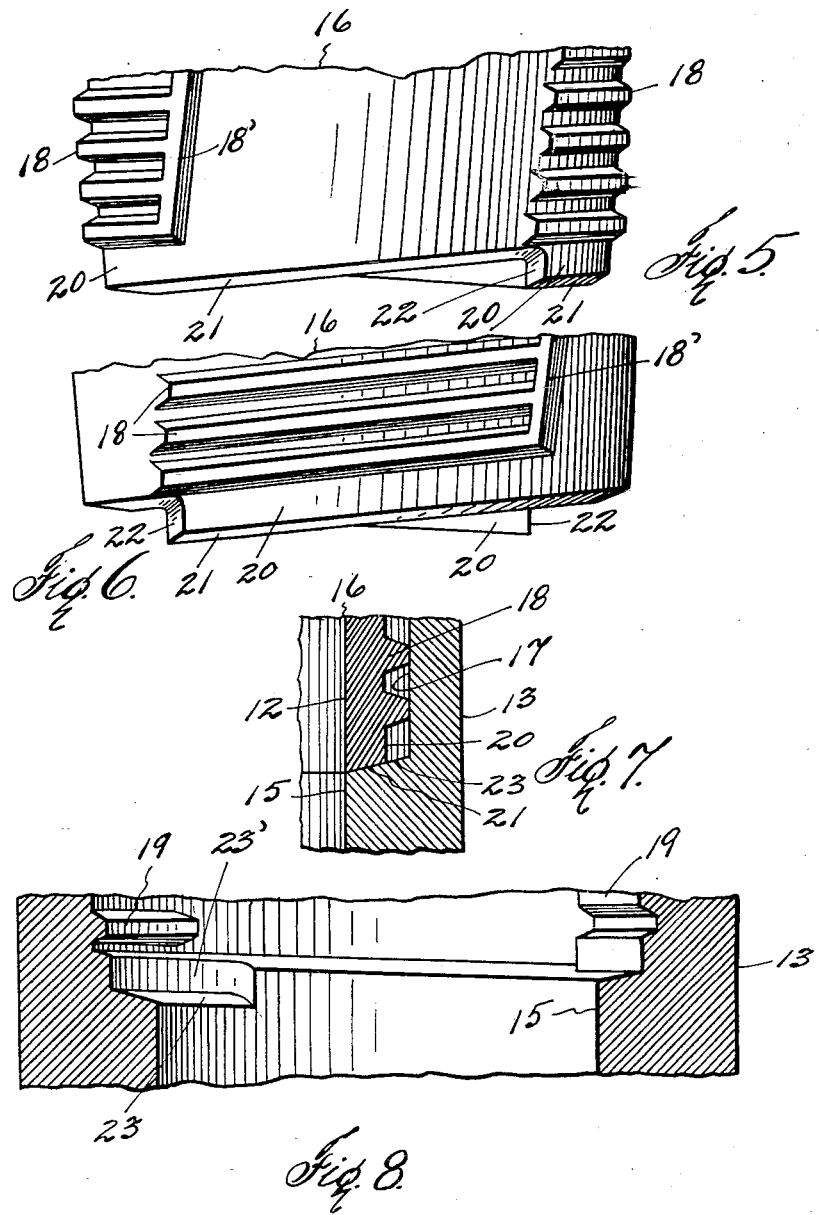

Patented Oct. 11, 1927.

1,645,032

UNITED STATES PATENT OFFICE.

ROBERT A. WILSON, OF DALLAS, TEXAS, ASSIGNOR TO THE GUIBERSON CORPORATION, OF DALLAS, TEXAS, A CORPORATION OF DELAWARE.

BOX AND PIN COUPLING.

Application filed June 14, 1926. Serial No. 116,031.

This invention relates to new and useful improvements in box and pin couplings.

The invention has to do with that type of coupling set forth in my co-pending application Ser. No. 39,416.

The object of the invention is to provide screw-thread panels on the pin and corresponding gaps in the box, inclined to the perpendicular, whereby said pin panels will upon riding down the gap tend to impart rotation to the pin, thus influencing the pin threads to ride into the box threads, when the pin is seated in the box.

A further object of the invention is to form the pin panels, each with a stop abutment along its trailing or following side, whereby the pin threads can not back into the threads of the next box panel, when the pin is unscrewed and also whereby said abutments become guides in inserting the pin panels in the gaps of the box.

A construction designed to carry out the invention will be hereinafter described together with other features of the invention.

The invention will be more readily understood from a reading of the following specification and by reference to the accompany drawings, in which an example of the invention is shown and wherein:

Fig. 1 is an elevation of the pin member of a joint constructed in accordance with my invention, Fig. 2 is a view of a box constructed in accordance with my invention, a portion being shown in elevation and a portion in section, Fig. 3 is an underside view of the pin member, Fig. 4 is a plan view of the box, Fig. 5 is an enlarged elevation of the improved pin, Fig. 6 is a similar view at right angles to Fig. 5, Fig. 7 is an enlarged vertical sectional view showing one of the shoes or extensions resting on the thread seat at the bottom of the well of the box, prior to the meshing of the threads, and Fig. 8 is a partial vertical sectional view taken on the line 8—8 of Fig. 4.

In the drawings the numeral 10 designates a pin member which has a screw threaded socket at its upper end to receive the usual screw threaded well tubing, stem, pipe or other tubular conductor 11, with which the joint is used. The member 10 has a longitudinal bore 12.

The pin member 10 constitutes one portion or element of the joint; while a box member 13 constitutes the other element or portion. The lower end of the box is screw-threaded to receive the complementary portion 14 of the tubing or other conductor 11. The box has an axial bore 15. The member 10 and the box 13 are screwed onto the tubular elements 11 and 14 in the usual manner; it being a common practice to make the threads comparatively fine and to taper the parts. This structure may vary according to the use and the particular conductors which are to be coupled. It is the intention to screw the member 10 and the box 13 onto the parts 11 and 14 in such a manner that they will remain so connected when the joint is unscrewed or broken. It is within the scope of the invention to form the box and pin integral with the conductors 11 and 14.

The member 10 is provided with a depending tapered pin 16. This pin is not tapered to the degree which has been the practice in this art, its angle of inclination to the perpendicular being much less acute than that of the pins made under Whittier Patent No. 964,353. The box 13 is formed with a countersunk tapering well 17 for receiving said pin.

The pin is provided with mutilated threads 18 arranged in two panels each occupying substantially one quarter of the circumference of the pin and disposed diametrically opposite each other. This provides gaps between the panels. The panels are formed of coarse threads, the convolutions of which are preferably spaced sufficiently to admit the forming of a second thread of the same pitch, intermediate said convolutions. The second thread is started diametrically opposite from the first thread. From the foregoing it will be seen that one of the threads begins at the lower end of one panel; while the other thread begins at the lower end of the diametrically opposite panel. By this arrangement ample thread bearing is had and a coarse thread is available. It is within the scope of the invention to utilize a single thread.

The well 17 is provided with double threads 19 which are mutilated and formed into diametrically opposite panels having substantially the same width as the gaps between the panels of the pin, so that the pin may be inserted in the well 17 its threads 18 received in the gaps of the well. The members are coupled by rotating the pin member 10 to mesh the threads.

Extensions 20 of the pin project below the thread panels. The lower edges 21 of the extensions are cut back on the same pitch as the opposite thread of the following panel. This causes the entrant end of each extension to drop off by a shoulder 22. The edges 21 of the extensions have the same bevel as the threads, but is subject to variation.

To receive and support the shoes at the bottom of the gaps between the threads 10 of the well 17 convolute seats or shoulders 23 are formed contiguous to the threads 19. Each seat extends convolutely below the panel in its forward path. The seats have the same pitch and bevel as the threads and edges 21. It will be seen by observing Figs. 4 and 8 that the seats 23 are not cut back under the threads 19 of the box as the extensions 20 do not carry threads and the making of the well is thus simplified and the elements at the bottom of the well are strengthened. An upright wall or annular socket 23' is formed below the thread panels and above the seats 23 for receiving the extensions 20.

When the pin 16 is inserted in the box the edges 21 of the extensions 20 will engage upon the seats 23. These edges will take the impact and with the seats will sustain the load. In order to start the threads 18 and 19 without lifting the pin after it is inserted and simply by rotating, guides at the lower ends of the gaps in the well 17 must be provided. If merely thread extensions or thread convolutions are used, then they must sustain the impact and load. But by the use of the edges 21 and the seats 23, having the same pitch as the threads, it is obvious that when the pin is rotated its thread 18 will be guided into the threads 19 in a free and easy manner.

The improved feature resides in the inclining of the thread panels 18 and 19 and the gaps therebetween, together with stop abutments 18' formed along the trailing or following ends of the threads of the panels 18. By reason of the inclined panels a tendency to rotate is imparted to the pin 16, thus causing the pin threads to enter the box threads when the pin is seated in the well of the box. This makes coupling very easy and reduces the labor. The abutments having the same inclination as the panels act as guides and ride along the ends of the threads of the panels 19 when the pin is inserted. When the joint is unscrewed the abutments strike the ends of the threads of the opposite panel 19, thus preventing the pin threads from backing into said panels and stopping rotation of the pin at the proper point for it to be readily lifted from the box.

The coupling is tightened by a quarter rotation of the member 10. At the upper end of the pin, an annular collar 24 is formed to fit snugly in the upper end of the well above the threads 19 thereof. An annular radial shoulder 25 overhangs the collar 24 and the parts are so proportioned that as the threads are meshed by the rotation of the member 10, the shoulder will frictionally engage the upper flat edge 26 of the box. As the coupling is tightened the frictional contact between the parts 25 and 26 will be increased, whereby the box and pin members will be adequately fastened together. Tests have demonstrated that the members will not unscrew when a drill pipe is rotated in a reverse direction in a well and a wrench is required to uncouple the joint. However the members are coupled or uncoupled by a quarter of a rotation.

Owing to the use of mutilated threads it is not necessary to give as much taper to the pin 16 as where continuous thread coupling for a two inch pipe can only be given an inch and one-eighth bore. It will be apparent that this coupling may be used in various places where it is desired to unite two pipes or tubular conductors. It is within the province of the invention to eliminate the taper from the pin 16 and well 17.

While I have shown the invention in connection with the extensions 20, it is to be understood that the invention may be applied to other forms of panel thread couplings, as for instance my former Patent No. 1,539,287.

Various changes in the size and shape of the different parts, as well as modifications and alterations, may be made within the scope of the appended claims.

What I claim, is:

1. A box and pin coupling comprising in combination, a pin member, a pin carried by the pin member and having longitudinally extending and circumferentially spaced screw thread panels on opposite sides thereof, said pin panels having their vertical edges inclined in the same direction, and a box member having a well for receiving the pin, said box well having longitudinally extending and circumferentially spaced screw thread panels on opposite sides thereof, the box panels also having their vertical edges inclined in the same direction, the gaps between the thread panels of the box being substantially constant in width throughout their lengths, the inclination of the panels and gaps imparting a slight rotation to the pin as it is inserted in the well of the box.

2. A box and pin coupling comprising in combination, a pin member, a pin carried by the pin member and having longitudinally extending and circumferentially spaced screw thread panels on opposite sides thereof, said pin panels having their vertical edges inclined in the same direction, a box member having a well for receiving the pin, said box well having longitudinally spaced screw thread panels on opposite sides thereof, the box panels also having their vertical edges inclined in the same direction, the gaps between the thread panels of the box being substantially constant in width throughout their lengths, the inclination of the panels and gaps imparting a slight rotation to the pin as it is inserted in the well of the box, and guide shoes at the lower end of the pin, the well of the box having seats for receiving the shoes and guiding the pin threads into the box threads.

3. A box and pin coupling comprising in combination, a pin member, a pin carried by the pin member and having longitudinally extending and circumferentially spaced screw thread panels on opposite sides thereof, said pin panels having their vertical edges inclined in the same direction, a box member having a well for receiving the pin, said box well having longitudinally extending and circumferentially spaced screw thread panels on opposite sides thereof, the box panels also having their vertical edges inclined in the same direction, the gaps between the thread panels of the box being substantially constant in width throughout their lengths, the inclination of the panels and gaps imparting a slight rotation to the pin as it is inserted in the well of the box, and stop abutments along the vertical trailing edges of the pin panels for preventing the intermeshing of the threads when the pin is unscrewed.

In testimony whereof I affix my signature.

ROBERT A. WILSON.